United States Patent [19]

Cavil et al.

[11] Patent Number: 4,483,682
[45] Date of Patent: Nov. 20, 1984

[54] LINEAR POWER ASSIST MECHANISM

[75] Inventors: David T. Cavil, Menomonee Falls; William R. Krueger, West Allis, both of Wis.

[73] Assignee: Outboard Marine Corporation, Waukegan, Ill.

[21] Appl. No.: 433,629

[22] Filed: Oct. 12, 1982

[51] Int. Cl.³ .............................................. B63H 21/26
[52] U.S. Cl. .................. 440/53; 114/144 R; 74/388 R; 74/480 B; 180/65.1
[58] Field of Search .................. 114/144 R, 160, 161; 440/53, 62, 63; 180/65.1, 3.5, 79.3; 74/89.2, 136, 388 R, 388 S, 496, 30, 480 B, 512, 25; 320/18

[56] References Cited

U.S. PATENT DOCUMENTS

| | | | |
|---|---|---|---|
| 3,135,095 | 6/1964 | Peterson | 74/480 B |
| 3,140,619 | 7/1964 | Miller | 74/388 R |
| 3,190,387 | 6/1965 | Dow | 180/65.1 |
| 3,367,195 | 2/1968 | Racine | 74/89.2 |
| 3,776,518 | 12/1973 | Witwer | 212/170 |
| 4,123,740 | 10/1978 | Palmer et al. | 180/65.1 |
| 4,131,833 | 12/1978 | McAuliffe et al. | 320/18 |
| 4,224,832 | 9/1980 | Prohaska et al. | 74/388 R |
| 4,419,084 | 12/1983 | Borst | 440/63 |

*Primary Examiner*—Trygve M. Blix
*Assistant Examiner*—Stephen P. Avila
*Attorney, Agent, or Firm*—Michael, Best & Friedrich

[57] ABSTRACT

The linear motion power assist mechanism includes a stationary member, a friction drum rotatably supported on the stationary member, an output member mounted for linear, reciprocative movement relative to the stationary member, an input member mounted for linear, reciprocative movement relative to the stationary member and relative to the output member, a first flexible member, such as a wire cable, loosely wound around the drum in one direction, a second flexible member loosely wound around the drum in the opposite direction, and an unidirectional motor rotating the drum. The first cable is tightened on the rotating drum and pulls the output member in a first direction in response to movement of the input member in the first direction. The second cable is tightened on the rotating drum and pulls the output member in the opposite or second direction in response to movement of the input in the second direction.

13 Claims, 5 Drawing Figures

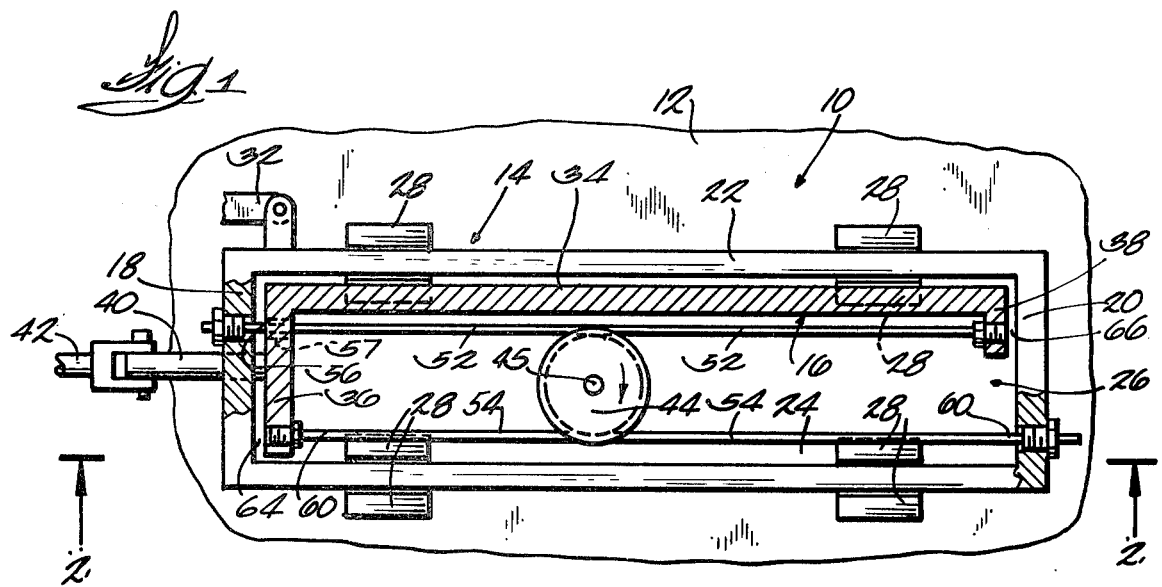

LINEAR POWER ASSIST MECHANISM

BACKGROUND OF THE INVENTION

This invention relates to power assist mechanisms and, more particularly, to power assist mechanisms for providing linear motion.

In certain control arrangements, it is desirable to provide a power assist to a part which is moved linearly. One example of such an arrangement is a throttle control for battery-operated vehicles including a switch having an actuating arm to which linear motion is imparted in response to movement of an accelerator pedal. Another example is a power steering arrangement for outboard motors including a tiller to which linear motion is applied by a push-cable or the like to provide steering of a propulsion unit. Prior linear power assist mechanisms usually are hydraulically or pneumatically operated and/or include relatively complex directional controls.

Attention is directed to the following U.S. patents:

| Patentee | U.S. Pat. No. | Issue Date |
|---|---|---|
| Ellis et al | 216,560 | June 17, 1879 |
| Crandall | 599,689 | March 1, 1898 |
| Anthony | 764,331 | July 5, 1904 |
| Crow | 776,385 | November 29, 1904 |
| Nelson | 842,416 | January 29, 1907 |
| Clark | 1,651,997 | December 6, 1927 |

SUMMARY OF THE INVENTION

The linear motion power assist mechanism provided by the invention includes a drum mounted for rotation about a stationary axis, means for rotating the drum in one direction, a movably mounted input member, a movably mounted output member, and means connected to the drum and to the input and output members for displacement of the output member in a first direction in response to movement of the input member in the first direction and for displacement of the output member in a second direction opposite to the first direction in response to movement of the input member in the second direction.

In one embodiment, the linear motion power assist mechanism includes a stationary member, a friction drum mounted on the stationary member for rotary movement about an axis, an output member mounted for linear, reciprocative movement relative to the stationary member in a direction generally perpendicular to the drum axis, an input member mounted for linear, reciprocative movement relative to the stationary member and relative to the output member in a direction generally perpendicular to the drum axis, a first flexible member loosely wound around the drum in one direction, and a second flexible member loosely wound around the drum in a direction opposite to that of the first flexible member. The opposite ends of the flexible members are connected to the input and output members. Means are provided for rotating the drum in one direction whereby the first flexible member is tightened on the drum and the output member is pulled in a first direction in a response to movement of the input member relative to the drum axis in the first direction, and the second flexible member is tightened on the drum and the output member is pulled in a second direction, opposite to the first direction, in response to movement of the input member relative to the drum axis in the second direction.

In one embodiment, the drum is driven by a unidirectional motor drivingly connected to the drum through clutch means for permitting the drum to be rotated independently of the motor by the flexible members in response to reciprocative movement of the input member when the motor is not operating.

In one embodiment, the input and output members are connected through a lost motion connection so that the input member is drivingly connected to the output member after a predetermined amount of movement of the input member relative to the output member in both the first and second directions.

In one embodiment, means are provided for biasing the input member toward a centered position relative to the drum.

In one embodiment, there is provided a marine propulsion device including a propulsion unit adapted to be supported on a boat transom for steering movement about a generally vertical steering axis, a tiller means for imparting steering movement to the propulsion unit, a steering assembly, and means connecting the steering assembly to the tiller means for steering the propulsion unit in response to operation of the steering assembly including a linear power assist mechanism described in the first and second paragraphs above under this Summary of the Invention, wherein the input member is connected to the steering assembly and the output member is connected to the tiller means.

In one embodiment, there is provided a vehicle including a chassis supported on front and rear wheels, an electric motor for driving one of the front or rear wheels, at least one battery carried by the chassis, and an electrical circuit for selectively connecting the battery to the motor. The electrical circuit includes a speed control switch having a series of contacts and a movable actuating arm for successively closing the contacts and connecting the battery to the motor, an accelerator pedal, and means for connecting the pedal to the actuating arm and moving the actuating arm in response to movement of the pedal including a linear power assist mechanism described above in the first and second paragraphs above under this Summary of the Invention, wherein the input member is connected to the pedal and the actuating arm is connected to the output member.

One of the principal features of the invention is the provision of a linear power assist mechanism which is simply constructed and is arranged to permit manual operation in the event the drive means fails.

Another of the principal features of the invention is the provision of a linear power assist mechanism employing rotational movement to provide a linear assist.

A further of the principal features of the invention is the provision of a linear power assist mechanism having automatic direction control.

A still further of the principal features of the invention is the provision of a marine position device having a power steering arrangement including a linear power assist mechanism described in the three preceding paragraphs.

A yet further of the principal features of the invention is the provision of a battery-operated vehicle having a pedal actuated speed control arrangement including a linear power assist mechanism described in the three paragraphs mentioned in the preceding paragraph.

Other features, aspects and advantages of the invention will become apparent to those skilled in the art upon reviewing the following detailed description, the drawings and the appended claims.

BRIEF DESCRIPTION OF THE DRAWINGS

FIG. 1 is a top plan view of a linear power assist mechanism incorporating various of the features of the invention.

FIG. 2 is a sectional view taken generally along the line 2—2 in FIG. 1.

FIG. 3 is a partial sectional view similar to FIG. 2 illustrating an alternate embodiment.

DESCRIPTION OF THE PREFERRED EMBODIMENTS

Figure 4:
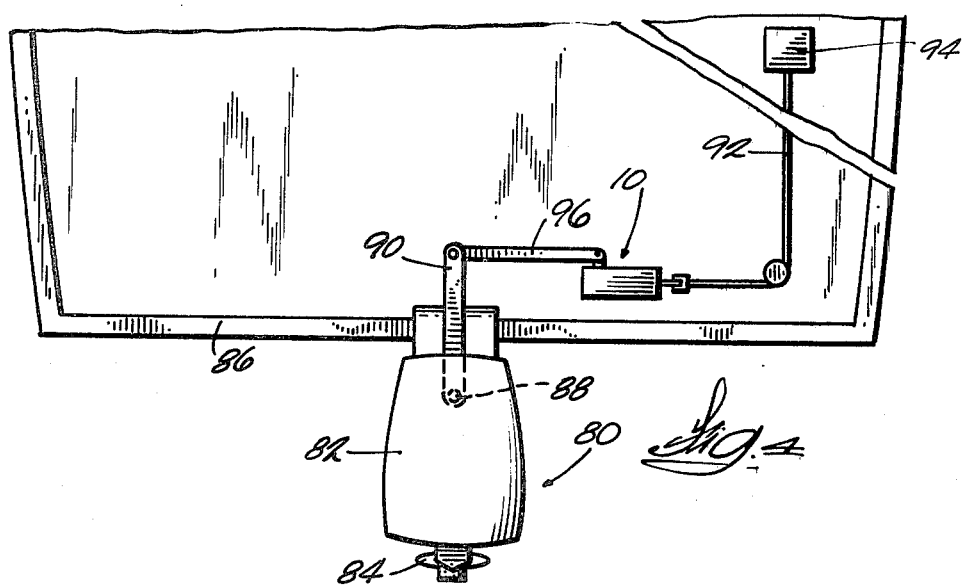
FIG. 4 is a diagrammatic representation of a marine propulsion device incorporating a linear power assist mechanism of the invention as part of the steering arrangement.

Illustrated in FIGS. 1 and 2 is a linear power assist mechanism 10 incorporating various of the features of the invention. The mechanism includes a stationary member 12, an output member 14 mounted for linear, reciprocative movement relative to the stationary member 12, and an input member 16 mounted for linear, reciprocative movement relative to the stationary member 12 and to the output member 14.

In the specific embodiment illustrated, the output member 14 has a box-like construction including opposed end walls or legs 18 and 20 and opposed side walls or arms 22 and 24 defining an elongated rectangular opening 26 in which the input member 16 is disposed. The side walls 22 and 24 extend generally parallel to the direction of travel of the output and input members 14 and 16. Movement of the output member 14 is guided by suitable means, such as guide blocks 28 mounted on the stationary member 12 and slidably receiving an edge of the side walls 22 and 24. The output member 14 is connected to a movable part (not shown) via a link 32.

The input member 16 includes an elongated element 34 and a pair of legs 36 and 38 extending from the opposite ends of the element 34. Movement of the input member 16 is guided by a pin 40 slidably received in the end wall 18 of the output member 14. The input member 16 is connected to an actuating part (not shown) for movement in response to the actuating part via a link 42 connected the pin 40.

The mechanism 10 also includes a friction drum 44 supported to the stationary member 12 for rotation about an axis 45. The friction drum 44 is located generally centrally in the output member opening 26 with the output member end walls 18 and 20 and the input member legs 36 and 38 located on the opposite sides of the drum axis 45. The friction drum 44 is driven by a unidirectional motor 46. In the specific embodiment illustrated, the motor 46 drives the friction drum 44 in a clockwise direction, as viewed in FIG. 1, through a suitable gear arrangement 48.

The input member 16 is connected to the output member 14 by a pair of flexible members 52 and 54, such as wire cables or straps, loosely wound around the friction drum 44. One end 56 of the flexible member 52 extends through an aperture 57 in the input member and is attached to the output member end wall 18. The other end 58 of the flexible member 52 is attached to the input member leg 38. One end 60 of the flexible member 54 is attached to the output member end wall 20 and the other end 62 is attached to the input member leg 36. As best shown in FIG. 2, the flexible members 52 and 54 are wound around the friction drum 44 in opposite directions.

In operation, both the flexible members 52 and 54 are disengaged from the friction drum 44 and the friction drum 44 rotates freely when no force is applied on the input member 16 via the link 42. Movement of the input member 16 to the right in a direction generally perpendicular to the drum axis 45 causes the flexible member 52 to tighten on the rotating friction drum 44. The flexible member 52 then pulls the output member 16 to the right in a direction generally perpendicular to the drum axis 45 as long as a sufficient force is applied on the input member 16 to keep the flexible member 52 tight on the friction drum 54.

Movement of the input member 16 to the left in a direction generally perpendicular to the drum axis 45 releases the flexible 52 member from the friction drum 44 and causes the flexible member 54 to tighten on the friction drum 44. The flexible member 54 then pulls the output member 14 to the left in a direction generally perpendicular to the drum axis 45 as long as a sufficient force is applied on the input member 16 to keep the flexible member 54 tight on the friction drum 44. Thus, the friction drum 44 is rotated in the same direction for both directions of travel of the output member 14.

The input member 16 preferably is mechanically trapped by the output member 14 as illustrated so that there will be a lost motion connection therebetween in the event either of the flexible members 52 and 54 fail. That is, in the event the flexible member 54 fails, the input member leg 36 engages the output member end wall 18 and the output member 14 is moved to the left in response to movement of the input member 16 to the left. In the event the flexible member 52 fails, the input member leg 38 engages the output member end wall 20 and the output member 14 is moved to the right in response to movement of the input member 16 to the right. The spaces 64 and 66 between the input member legs 36 and 38 in the output member end walls 18 and 20 permit enough movement of the input member 16 relative to the output member 14 for the flexible members 52 and 54 to tighten on and release from the friction drum 44 as described above during normal operation. However, this spacing should be kept to a minimum in order to minimize the amount of lost motion in the event a flexible member fails.

The friction drum 44 can be connected to the motor 46 through an overrunning clutch 70 (FIG. 2) so that, in the event the motor 46 fails, the friction drum 44 can be rotated independently of the motor 46. This permits the input member 16 to move the output member 14 via the flexible members 52 and 54 without a power assist.

When the mechanism 10 is used for a power steering system, means can be provided for returning the input member 14 to a centered position relative to the drum axis 45. For example, as illustrated by the dashed lines in FIG. 2, such means can include a pair of springs 72 and 74 having one end connected to a respective input member leg 36 and 38 and the opposite end connected to the stationary member 12.

FIG. 3 illustrates an alternate embodiment wherein the output member 14 and the input member 16 move together as an assembly relative to the friction drum 44 without applying a linear force on the input member 14.

In this embodiment, means are provided for applying a sufficient force between the output member 14 and the input member 16 to tighten the flexible members 52 and 54 on the friction drum 44. In the specific construction illustrated, such means include a pair of wedge element 76 and 78 located above and mounted for reciprocative vertical movement relative to the output and input members 14 and 16. The wedge element 76 is aligned with the space 64 between the output member end wall 18 and the input member leg 36. The wedge element 78 is aligned with a space 66 between the output member end wall 20 and the input member leg 38. The wedge elements 76 and 78 are selectively moved into and retracted from the spaces 64 and 66 by a suitable motive means (not shown) connected to the wedge elements 76 and 78 via respective connecting links 80 and 82.

When movement of the output member 14 to the right is desired, the wedge element 76 is moved downwardly into the space 64 with sufficient force to move the input member 16 to the right relative to the output member 14 and cause the flexible member 52 to tighten on the friction drum 44. The output members 14 and 16 continue to move together relative to the friction drum 44 until the wedge element 76 is withdrawn from the space 64. When movement of the output member 14 to the left is desired, the wedge element 78 is moved downwardly into the space 66 to cause a flexible member 54 to tighten on the friction drum 44. Mechanical stops can be provided to limit the travel of the output member 14 to that corresponding to the free lengths of the flexible member 52 and 54. Also, a slip clutch means can be provided for disengaging the friction drum drive when the output member 14 reaches the opposite ends of its travel.

FIG. 4 is a diagrammatic representation of a marine propulsion device, such as an outboard motor 80. The outboard motor 80 has a propulsion unit 82 which carries a propeller 84 on the lower portion and is suitably mounted on a boat transom 86 for steering movement about a generally vertical steering axis 88. The propulsion unit 82 is steered by movement of a tiller arm 90 which is moved back and forth in response to a push-pull cable 92 connected to a conventional steering assembly 94.

The force transmitted to the tiller arm 90 by the push-pull cable 92 is amplified by a linear power assist mechanism 10 described above. The push-pull cable 92 is connected to the input member 16 of the mechanism 10 and the tiller arm 90 is connected to the output member 14 of the mechanism 10 through a suitable linkage arrangement 96.

Figure 5:
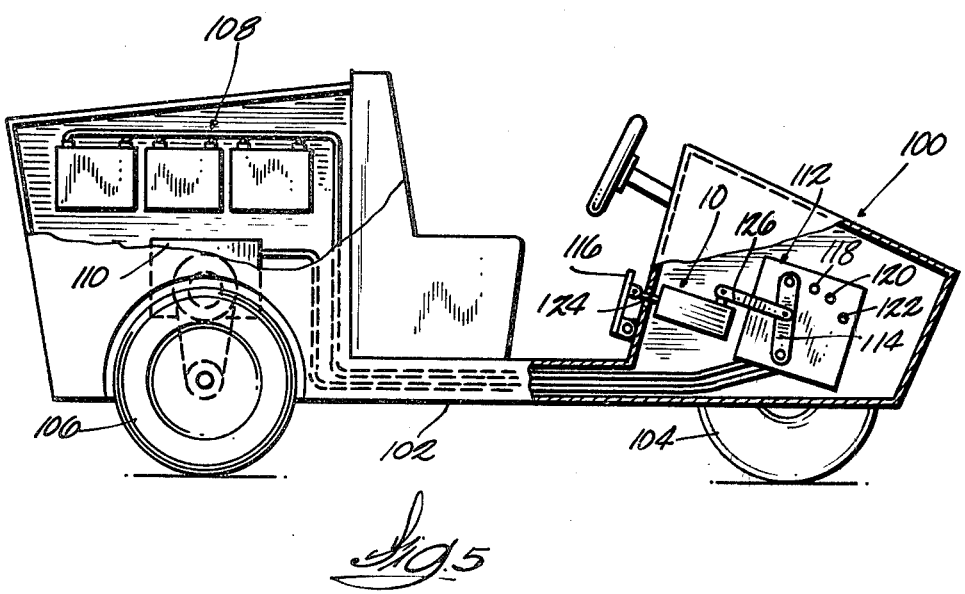
FIG. 5 is a diagrammatic representation of a battery-operated vehicle incorporating a linear power assist mechanism of the invention.

FIG. 5 is a diagrammatic representation of a battery-operated vehicle 100 such as a golf cart or a small personnel carrier. The vehicle 100 includes a chassis 102 supported on front and rear wheels 104 and 106 and a bank of batteries 108 which energize a direct current motor 110 drivingly connected to the rear wheels 106. The battery bank 108 is electrically connected to the motor 110 through a battery tapping arrangement including a speed control switch 112 having an actuating arm 114 which is moved in response to movement of an accelerator pedal 116 which, as in common usage, is biased by suitable means (not shown) from a depressed position to a released position.

The battery tapping arrangement is arranged to electrically connect the battery bank 108 to the motor 110 at selective levels of potential and so that the motor 110 is alternately connected to opposite ends of the battery bank 108 each time the accelerator pedal 16 is released and depressed again. The battery tapping arrangement can be constructed in accordance with the U.S. Pat. No. 4,131,833, to McAuliffe et al issued Dec. 26, 1978, which patent is incorporated herein by reference.

Generally, the speed control switch 112 includes a series of normally open contacts 118, 120 and 122 which are successively engaged by the actuating arm 114 and closed as the accelerator pedal 116 is depressed. The motor 110 is operated through the closed contacts at a desired potential level and, thus, at a desired speed. The battery tapping arrangement also includes a cycling switch (not shown) which is energized each time the accelerator pedal 116 is depressed and fully released and the actuating arm 114 is completely disengaged from the switch contacts 118, 120 and 122. Energization of the cycling switch alternately connects the motor 110 with the opposite ends of the battery bank 108.

The force transmitted to the actuating arm 114 by the actuating pedal 116 is amplified by a linear power assist mechanism 10 described above. The accelerator pedal 116 is connected to the input number 16 of the mechanism 10 through a suitable linkage 124 and the actuating arm 114 is connected to the output member 14 of the mechanism 10 through a suitable linkage 126.

Various of the features of the invention are set forth in the following claims:

We claim:

1. A linear motion power assist mechanism comprisng a stationary member, a friction drum supported on said stationary member for rotary movement about an axis, an output member mounted for linear, reciprocative movement relative to said stationary member in a direction generally perpendicular to the drum axis, said output member having first and second portions which are spaced from each other and are located on the opposite sides of the drum axis, an input member mounted for linear, reciprocative movement relative to said stationary member and relative to said output member in a direction generally perpendicular to the drum axis, said input member having first and second portions which are spaced from each other and are located on the opposite sides of the drum axis, a first flexible member loosely wound around said drum in one direction and having a first end connected to said first portion of said output member and a second end connected to said second portion of said input member, a second flexible member loosely wound around said drum in a direction opposite to that of said first flexible member and having a first end, connected to said first portion of said input member and a second end connected to said second portion of said output member, and means for rotating said drum in one direction, whereby said first flexible member is tightened on said drum and said output member is pulled in a first direction in response to movement of said input member relative to the drum axis in a first direction and said second flexible member is tightened on said drum and said output member is pulled in a second direction, opposite to said first direction, in response to movement of said input member relative to the drum axis in the second direction.

2. A linear power assist mechanism according to claim 1 wherein said means for rotating said drum includes an unidirectional motor drivingly connected to said drum through clutch means for permitting said drum to be rotated independently of said motor by said first and second flexible members in response to reciprocative movement of said input member when said motor is not operating.

3. A linear power assist mechanism according to claim 1 including means on said input member and on said output member for drivingly connecting said input member with said output member after a predetermined amount of movement of said input member relative to said output member in both the first and second directions.

4. A linear power assist mechanism according to claim 3 wherein said output member includes an elongated part extending generally parallel to the direction of travel of said input and output members, and wherein said input member includes an element extending generally parallel to said direction of travel of said input and output members, and wherein said means on said input member and on said output member for drivingly connecting said input member with said output member comprises a pair of longitudinally spaced legs extending from said part and a pair of drive portions extending from said element for engaging said output member legs after said predetermined travel of said input member relative to said output member.

5. A linear power assist mechanism according to claim 4 including means for selectively applying a force between said output member legs and said input member drive portions to cause sufficient movement of said input member relative to said output member to tighten a respective one of said flexible members on said drum.

6. A linear power assist mechanism according to claim 1 including means for biasing said input member toward a centered position relative to said drum.

7. A linear power assist mechanism according to claim 1 including means for selectively applying a linear force on said input member to move said input member.

8. A linear power assist mechanism comprising a drum mounted for rotation about a stationary axis, means for rotating said drum in one direction, an input member mounted for movement relative to a non-driving position, a movably mounted output member, and means for displacing said output member in a first direction in response to movement of said input member in the first direction from the non-driving position and for displacing said output member in a second direction opposite to the first direction in response to movement of the input member in the second direction from the non-driving position said means for displacing said output member comprising a pair of flexible members wound in opposite relation around said drum and for slippage therebetween when said input member is in the non-driving position and connected to said input and output members.

9. A marine propulsion device comprising a propulsion unit carrying a propeller, means adapted to support said propulsion unit from a boat transom for steering movement about a generally vertical steering axis, tiller means connected to said propulsion unit for imparting steering movement to said propulsion unit, a steering assembly, and means connecting said steering assembly to said tiller means for steering said propulsion unit in response to operation of said steering assembly including a linear power assist mechanism including a drum mounted for rotation about a stationary axis, means for rotating said drum in one direction, a movably mounted input member connected to said steering assembly and having first and second portions which are spaced from each other and are located on the opposite sides of the drum axis, a movably mounted output member connected to said tiller means and having first and second portions which are spaced from each other and are located on the opposite sides of the drum axis a first flexible member loosely wound around said drum in one direction for slippage therebetween and having a first end connected to said first portion of said output member and a second end connected to said second portion of said input member, and a second flexible member loosely wound around said drum in a direction opposite to that of said first flexible member and for slippage between said second member and said drum, and having a first end connected to said first portion of said input member and a second end connected to said second portion of said output member.

10. A vehicle comprising a chassis supported on front and rear wheels, an electric motor for driving one of said front and rear wheels, at least one battery carried by said chassis, an electrical circuit for selectively connecting said battery to said motor, said circuit including a speed control switch having a series of contacts and a movable actuating arm for successively closing said contacts and connecting said battery to said motor, an accelerator pedal, and means for connecting said pedal to said actuating arm for moving said actuating arm in response to movement of said pedal including a linear power assist mechanism including a drum mounted for rotation about a stationary axis, means for rotating said drum in one direction, a movably mounted input member connected to said pedal and having first and second portions which are spaced from each other and are located on the opposite sides of the drum axis, a movably mounted output member connected to said actuating arm and having first and second portions which are spaced from each other and are located on the opposite sides of the drum axis, a first flexible member loosely wound around said drum in one direction for slippage therebetween and having a first end connected to said first portion of said output member and a second end connected to said second portion of said input member, and a second flexible member loosely wound around said drum in a direction opposite to that of said first flexible member and for slippage between said second member and said drum and having a first end connected to said first portion of said input member and a second end connected to said second portion of said output member.

11. A linear power assist mechanism comprising a drum mounted for rotation about a stationary axis, means for rotating said drum in one direction, a movably mounted input member having first and second portions which are spaced from each other and are located on the opposite sides of the drum axis, a movably mounted output member having first and second portions which are spaced from each other and are located on the opposite sides of the drum axis, a first flexible member loosely wound around said drum in one direction for slippage therebetween and having a first end connected to said first portion of said output member and a second end connected to said second portion of said input member, and a second flexible member loosely wound around said drum in a direction opposite to that of said first flexible member and for slippage between said second member and said drum and having a first end connected to said first portion of said input member and a second end connected to said second portion of said output member.

12. A marine propulsion device comprising a propulsion unit carrying a propeller, means adapted to support said propulsion unit from a boat transom for steering movement about a generally vertical steering axis, tiller means connected to said propulsion unit for imparting steering movement to said propulsion unit, a steering assembly, and means connecting said steering assembly to said tiller means for steering said propulsion unit in response to operation of said steering assembly including a linear power assist mechanism including drum mounted for rotation about a stationary axis, means for rotating said drum in one direction, an input member connected to said steering assembly and mounted for movement relative to a non-driving position, a movably mounted output member connected to said tiller means, and means for displacing said output member in a first direction in response to movement of said input member in the first direction from the non-driving position and for displacing said output member in a second direction opposite to the first direction in response to movement of the input member in the second direction from the non-driving position, said means for displacing said output member comprising a pair of flexible members wound in opposite relation around said drum and for slippage therebetween when said input member is in the non-driving position and connected to said input and output members.

13. A vehicle comprising a chassis supported on front and rear wheels, an electric motor for driving one of said front and rear wheels, at least one battery carried by said chassis, an electrical circuit for selectively connecting said battery to said motor, said circuit including a speed control switch having a series of contacts and a movable actuating arm for successively closing said contacts and connecting said battery to said motor, an accelerator pedal, and means for connecting said pedal to said actuating arm for moving said actuating arm in response to movement of said pedal including a linear power assist mechanism including a drum mounted for rotation about a stationary axis means for rotating said drum in one direction, an input member connected to said pedal and mounted for movement relative to a non-driving position, a movably mounted output member connected to said actuating arm and means for displacing said output member in a first direction in response to movement of said input member in the first direction from the non-driving position and for displacing said output member in a second direction opposite to the first direction in response to movement of the input member in the second direction from the non-driving position, said means for displacing said output member comprising a pair of flexible members wound in opposite relation around said drum and for slippage therebetween when said input member is in the non-driving position and connected to said input and output members.

* * * * *